United States Patent Office 3,320,100
Patented May 16, 1967

3,320,100
SUBMERGED ARC FLUX COMPOSITION AND
METHOD OF MAKING THE SAME
Thomas L. Coless, Maplewood, N.J., assignor to Union
Carbide Corporation, a corporation of New York
No Drawing. Filed Sept. 23, 1964, Ser. No. 399,870
7 Claims. (Cl. 148—26)

This application is a continuation-in-part of my copending application Ser. No. 209,287, filed July 12, 1962, now abandoned.

This invention relates to a submerged arc welding composition and, more particularly, to a submerged arc flux composition for welding and surface depositing nickel, nickel base alloys, and nickel steels.

Metals such as Inconel, which is a nickel base alloy, have been receiving wider preference in the nuclear power applications; for example, over the more easily welded stainless steels. Inconel, of course, has high temperature and corrosion resistant properties which make this metal an ideal choice for nuclear power applications.

Additionally, nickel steels such as 9 percent nickel and 18 percent nickel have found, or are finding, wide applicability in industry. For example, 9 percent nickel steel has been found to be ideally suited for construction of vessels to store, produce, or transport liquefied gases at temperatures as low as −320 degs. F. The 18 percent nickel steels are expected to find utility in the missile industry because of their unique high tensile properties and weldability.

These metals heretofore have been deposited by stick electrode or inert gas welding techniques. Up until now the cheaper and less time consuming submerged arc process, described in U.S. Patent No. 2,043,960, for depositing equivalent amounts of surface metal has not found acceptance because there has not been a composition available which produces the desired results. Attempts to make deposits with the submerged arc process have resulted in an unacceptable bead shape and in deposits having inclusions, cracks, and microfissures. Further, none of the presently known submerged arc flux compositions are capable of producing a free-peeling slag on metals such as the nickel base alloys since slag removal is more of a problem with these materials than with ferrous alloys due to the different coefficient of expansion and the thermal and electrical conductivity of the nickel base alloys.

Accordingly, it is an object of this invention to provide a composition for submerged arc welding and surface depositing nickel, nickel base alloys and nickel steels.

It is a further object to provide a composition for welding and surface depositing such metals regardless of the chemistry of the wire used.

A further object is to provide a composition which will produce substantially no silicon pick-up from the composition by the weld metal.

Another object is to provide a method for making such composition.

Still another object is to provide a self-detaching composition capable of producing weld metal containing a low silicon level.

These and other objects will either be pointed out or become apparent from the following description and claims:

Nickel, nickel base alloys and nickel steels can now be successfully welded or deposited on surfaces to be cladded with the submerged arc welding process when a flux composition is utilized having the following general ingredients in the ranges indicated:

TABLE I

| Material: | Percent by wt. |
|---|---|
| Aluminum oxide ($Al_2O_3$) | 20–60 |
| Marble ($CaCO_3$) | 10–40 |
| Manganese slag ($MnO\text{-}SiO_2$) | 0–15 |
| Calcium fluoride ($CaF_2$) | 10–30 |
| Cryolite ($Na_3AlF_6$) | 5–20 |
| Magnesia (MgO) | 0–15 |

The above general ingredients are agglomerated by means of a suitable material e.g. a hydrocarbon granulating agent such as corn syrup. The quantity of hydrocarbon granulating agent necessary ranges from about 5 to 20 percent by weight. The advantages of the so-called "bonded" fluxes are well known in the art. It should be noted that the ingredients listed above and in the following more specific examples represent the actual materials and not the result of a chemical analysis of a compound resulting from interfusion of such ingredients.

The composition of the invention has greatly advanced the art of submerged arc welding. All present commercial grades of submerged arc compositions contain considerable percentages of oxidizing components which will, under welding conditions, oxidize the weld metals. The composition of the invention is composed essentially of non-oxidizing constituents so that any readily oxidizable elements in the wire which should be transferred to the weld may be so transferred without oxidation; thus providing for almost complete transfer of these elements from the wire to weld.

Because of the non-oxidizing nature of the composition, metallic additions in the flux are not necessary to compensate for losses through oxidation in Inconel-type surfacing applications.

Cryogenic materials, such as the 9 percent nickel steels, are commonly joined with wire of the Inconel-type alloys to obtain low temperature impact values but quite often lack the required tensile properties. In such cases metallic additions may be incorporated in the flux to supplement the elements in the wire to improve tensile properties.

Maraging steels, such as 18 percent nickel steels, depend upon an aging process to develop their high tensile strengths. Because of the nature of the aging process, it is desirous to match the weld metal with the base metal chemistry. This requires low silicon and manganese in the deposit. The composition of the invention is a low silica, low manganese composition, and therefore does not add or introduce these elements to the deposit. Further, since the composition of the invention is a low silica composition (less than 3 percent $SiO_2$) such composition may be used to weld any material wherein silicon pick-up by the weld metal is deleterious. This is particularly true of the high impact steels such as HY–80 and T–1.

The composition provides additional heat of reaction to the deposit during welding due to the exothermic decomposition reaction of $CaCO_3$ to CaO and $CO_2$. This produces a wider and more satisfactory bead when the composition is used for surfacing applications.

The composition of the invention produces a fused slag which is self-detaching, thereby leaving the deposit free from adhering and entrapped slag; adhering and entrapped slag is known in the art as "sharding."

Examples of typical metals which can be worked with the composition of the invention are:

(1) Inconel which has the following chemical composition.

| Material: | Percent |
|---|---|
| Nickel | 72.0 |
| Chromium | 14.0–17.0 |
| Iron | 6.0–10.0 |
| Manganese | 1.0 |
| Copper | 0.50 |
| Silicon | 0.50 |
| Carbon | 0.15 |
| Sulfur | 0.015 |

(2) Hastelloys such as Hastelloy X which has the following chemical composition.

| Material: | Percent |
|---|---|
| Cobalt | 0.50– 2.50 |
| Chromium | 20.50–23.00 |
| Molybdenum | 8.00–10.00 |
| Tungsten | 0.20– 1.00 |
| Iron | 17.00–20.00 |
| Carbon | 0.05– 0.15 |
| Silicon | 1.00 |
| Manganese | 1.00 |
| Nickel, balance. | |

(3) Nickel steels, such as 9 percent nickel steel, the composition and properties of which are defined by the ASTM specification A-353.

(4) The maraging steels, such as those which contain 18 and 24 percent nickel.

(5) High impact steels such as HY-80 and T-1.

Referring to the general composition given in Table I it should be noted that manganese slag is utilized as a source of manganese oxide; manganese aids in stabilizing the arc. Manganese slag contains no manganese dioxide; thus, there is substantially no manganese dioxide present in the composition to oxidize readily oxidizable elements in the wire which should be transferred to the weld in non-oxidized form. However, while a manganese slag is greatly preferred, managese ores which contain manganese dioxide may be utilized since such a low percentage of manganese-bearing material is present in the composition.

Further, in the preferred composition the MgO is kept low. However, the MgO may be increased provided there is a corresponding decrease in the $Al_2O_3$. Magnesium oxide is present to aid in peeling.

It should also be noted that the composition of the invention contains extremely low percentages of silica, in fact, in the preferred compositions the silica is usually less than about 3 percent by weight. This is a radical departure from the prior art submerged arc compositions. Silica is usually used in such compositions to produce good bead shape and arc stability. On the other hand, the silica in the composition will transfer across the arc and be picked up by the weld metal as silicon which is deleterious to the weld metal. Usually the silicon pick-up will be less than 0.6 percent with the composition of the prior art. However, when submerged arc welding metals such as the high impact steels, for example HY-80 and T-1, the maraging steels such as 18 and 24 percent nickel steels and, of course, the nickel base alloys such as Inconel and the Hastelloys, silicon pick-up of even 0.6 percent is extremely harmful to the strength of the weld. The composition of the invention maintains the performance quality of prior art compositions while eliminating the silica.

The composition of the present invention is made by sizing the above raw materials to about 100 x D mesh. The sized matreials are then dry blended thoroughly. A liquid hydrocarbon granulating agent is then added to the blended mixture. At this point, the hydrocarbon granulating agents acts as an agent forming granules from the fine mesh size materials which remain as such after complete higher temperature drying. The wet mixture is passed through a rotary dryer kiln at a temperature of between 1500 and 1800 degs. F. and preferably around 1750 degs. F. whereby most of the hydrocarbon granulating agent is burned out and some of the $CaCO_3$ is decomposed. Since the hydrocarbon granulating agent is decomposed during the drying process, final bonding of the individual constituents in the form of granules is believed to be obtained by surface sintering or some solid state eutectic type reaction of the lower melting point constituents such as cryolite, calcium fluoride and manganese slag. After the material leaves the kiln the oversize is screened off and the remainder is ready for use. The amount of oversize from this process is extremely low being less than about 3 percent.

The hydrocarbon granulating agent may be corn syrup, cane or sugar syrup, molasses, starches, etc., or a plastic-type granulating agent such as methyl-methacrylate. Other conventional bonding agents such as the metal silicates may be used; however, these are not as desirous as the hydrocarbon granulating agents because they will increase the $SiO_2$ content which is, of course, detrimental in most instances.

It should be noted that the materials such as the hydrocarbon or metal silicates are merely original granulating agents and that the ingredients themselves, in the composition, actually form the bonding agent. Accordingly, it is within the scope of this invention to form the granular particles by any means since the final bonding is not dependent on the use of such means but on the functional ingredients in the flux. In this sense, then, the composition may be regarded as self-bonding.

The hydrocarbon material, besides acting as an original granulating agent, has two additional beneficial effects. The greater percentage of the components of the composition of the invention are non-oxidizing; however, there is a small percentage of components such as oxides of manganese and silicon which can exist in the higher valence state. However, the carbon monoxide atmosphere created by the decomposition of the hydrocarbon granulating agent prevents the formation of these higher valence oxides and will even reduce such oxides if they are present.

Secondly, some residual carbon remains in the composition and acts as deoxidizer during welding.

The following is an example of a specific composition made according to the foregoing general formula which has been used satisfactorily.

TABLE II

| Material: | Parts by wt. |
|---|---|
| Aluminum oxide ($Al_2O_3$) | 37 |
| Marble ($CaCO_3$) | 24 |
| Manganese slag (40% MnO–40% $SiO_2$) | 8 |
| Calcium fluoride ($CaF_2$) | 19 |
| Cryolite ($Na_3AlF_6$) | 11 |
| Magnesia (MgO) | 1 |
| Hydrocarbon granulating agent | 11.5 |

It should be understood that other fluorine-bearing compounds such as LiF, NaF, and $MgF$, AlF, KF, $Na_3AlF_6$, may be substituted for CaF. Also it should be noted that the flux of the invention is a low silica flux; that is highly desirable since silica increases the adhesion of the slag to the weld and also promotes cracks.

Further, materials such as calcined bauxite may be used as a source of aluminum oxide instead of essentially pure aluminum oxide.

The following are typical performance examples of the composition of the invention:

*Example I*

A 2 in. thick mild steel plate was surfaced with Inconel using A.C. power and the submerged series arc process defined in U.S. Patent No. 2,669,640 issued to F. G. Outcalt. The disclosure of such process, as required herein for a complete understanding of the method of series arc cladding, is incorporated by reference. The welding conditions were as follows: two 5/32 in. diameter Inconel wires were connected in a series A.C. circuit. The composition was substantially the same as that defined in Table II above. The deposit was made as follows: five beads on the first layer, three beads on the second layer, and two beads on the third layer. Each bead was made with 30 volts on each wire with 500 amperes and a travel speed of 11 i.p.m. The resulting deposit had a uniform penetration pattern and satisfactorily passed stress corrosion tests. There was no sharding.

Alternating current operation is preferable to D.C. operation since A.C. produces a more uniform penetration pattern and reduces tendency of arc blow.

*Example II*

The composition of the invention has also been used to weld cryogenic steels such as 9 percent nickel steel.

A ¾ in. thick, 9 percent nickel plate was joined in a V joint by using ⅛ in. diameter, 50 percent nickel, 10 percent chromium wire using welding composition of the invention. The weld was made using D.C.R.P. with 32 volts and 310 amperes at a travel speed of 25 i.p.m. The weld developed high impact values.

*Example III*

Welds have also been made on 18 percent nickel steels, the following being a typical example thereof: a double V grooved, 1 in. thick, 18 percent nickel steel plate was welded with 5/32 in. diameter, 18 percent nickel steel welding wire. The weld was made in three passes; the first pass made on the first side was made using 32 volts, 730 amperes A.C. and 24 i.p.m. travel speed. The second and third passes were made on the other side. The second pass was made using 29 volts, 750 amperes A.C. and 22 i.p.m. travel speed while the third pass was made using 33 volts, 750 amperes, and 18 i.p.m. travel speed. In every case the welds had excellent slag removal with good X-ray weld quality.

Since fluoride compounds are not oxides they do not enter into the oxidization-reduction reaction which normally occurs in the weld zone. Therefore, fluoride compounds can be a substantial amount of the present flux system. For example, as much as 90% by weight of the flux can be fluoride compounds. The remainder of the flux system would be stable oxides, i.e. $Al_2O_3$; MgO or their equivalents such as $TiO_2$; $ZrO_2$ etc., to maintain the desirable welding characteristics of the flux. Namely that such flux system promote arc stability and result in a good bead shape.

From the foregoing examples and description of the invention, it can be seen that there is provided, for the first time, a submerged arc flux composition which permits the use of the submerged arc process for welding metals such as nickel, nickel steel, and nickel base alloys. Furthermore, there is provided for the first time, a submerged arc flux which essentially prevents transfer of manganese and silicon from the composition to the weld metal. This feature is notable since the 18 percent nickel steels cannot be welded successfully unless manganese and silicon pick-up from the composition is severely restricted.

What is claimed is:

1. A self-bonding flux composition suitable for use in submerged arc welding consisting of the following ingredients in approximately the indicated percentages.

| Material: | Percent by wt. |
|---|---|
| Aluminum oxide ($Al_2O_3$) | 20–60 |
| Marble ($CaCO_3$) | 10–40 |
| Manganese slag ($MnO-SiO_2$) | Up to 15 |
| Calcium fluoride ($CaF_2$) | 10–30 |
| Cryolite ($Na_3AlF_6$) | 5–20 |
| Magnesia (MgO) | Up to 15 | wherein said ingredients are self-bonding.

2. A flux composition suitable for use in submerged arc welding consisting of the following ingredients in approximately the indicated percentages.

| Material: | Percent by wt. |
|---|---|
| Aluminum oxide ($Al_2O_3$) | 37 |
| Marble ($CaCO_3$) | 24 |
| Manganese slag ($MnO-SiO_2$) | 8 |
| Calcium fluoride ($CaF_2$) | 19 |
| Cryolite ($Na_2AlF_6$) | 11 |
| Magnesia (MgO) | 1 |
| Total | 100 | wherein the cryolite and calcium fluoride act as the bonding agent.

3. A granular flux composition for submerged arc welding consisting of 20–60 percent by weight of aluminum oxide; 10–40 percent by weight calcium carbonate; up to 15 percent by weight of a manganese bearing material selected from the class consisting of a manganese slag and manganese ore; 10–30 percent by weight of a fluoride-bearing compound taken from the class consisting of calcium fluoride, sodium fluoride, magnesium fluoride, and lithium fluoride; 5–20 percent by weight of cryolite; up to 15 percent by weight of magnesium oxide, wherein said ingredients are self-bonding.

4. A method for making a bonded flux comprising sizing the following materials to at least 100 x D mesh.

| Material: | Percent by wt. |
|---|---|
| Aluminum oxide ($Al_2O_3$) | 20–60 |
| Marble ($CaCO_3$) | 10–40 |
| Manganese slag ($MnO-SiO_2$) | Up to 15 |
| Calcium fluoride ($CaF_2$) | 10–30 |
| Cryolite ($Na_2AlF_6$) | 5–20 |
| Magnesia (MgO) | Up to 15 | dry blending such sized materials; mixing in about 5 to 20 percent of a hydrocarbon granulating agent to agglomerate such dry blended fine materials; passing said agglomerated mixture through a heated atmosphere at a temperature of from 1500 to 1800 degs. F. to finally bond such ingredients and burn out most of said hydrocarbon and decompose some of said marble.

5. Method according to claim 4 wherein the heating atmosphere is about 1750 degs. F.

6. A self-bonding flux composition suitable for use in submerged arc welding consisting of the following ingredients in approximately the indicated percentages.

| Material: | Percent by wt. |
|---|---|
| Aluminum oxide ($Al_2O_3$) | 20–60 |
| Marble ($CaCO_3$) | 10–40 |
| Calcium fluoride ($CaF_2$) | 10–30 |
| Cryolite ($Na_3AlF_6$) | 5–20 |
| Magnesia (MgO) | Up to 15 | wherein said ingredients are self-bonding.

7. A method for making a bonded flux comprising sizing the following ingredients to at least 100 x D mesh: up to about 90% by weight of a compound taken from the class consisting of calcium fluoride, sodium fluoride, magnesium fluoride, lithium fluoride, potassium fluoride and cryolite, the remainder being at least one oxide taken from the class consisting of $Al_2O_3$, MgO, $TiO_2$, $ZrO_2$ and $CaCO_3$, dry blending such sized materials; mixing in about 5 to 20 percent of a hydrocarbon granulating agent to agglomerate such dry blended fine materials; passing said agglomerated mixture through a heated atmosphere at a temperature of from 1500 to 1800 degs. F. to finally bond such ingredients and burn out most of said hydrocarbon.

References Cited by the Examiner

UNITED STATES PATENTS 3,184,345  5/1965  Kerekes _____ 148—26
3,208,886  9/1965  Reilley et al. _____ 148—26

DAVID L RECK, *Primary Examiner.*

HYLAND BIZOT, *Examiner.*

H. SAITO, *Assistant Examiner.*